Nov. 14, 1967      V. A. DI RAMIO      3,352,609
THREADLESS ELEMENT-RETAINING ASSEMBLY
Filed Dec. 7, 1965
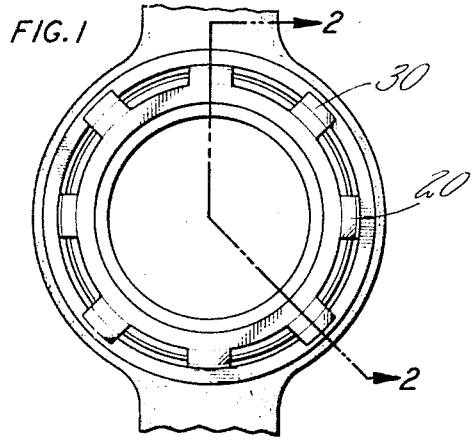
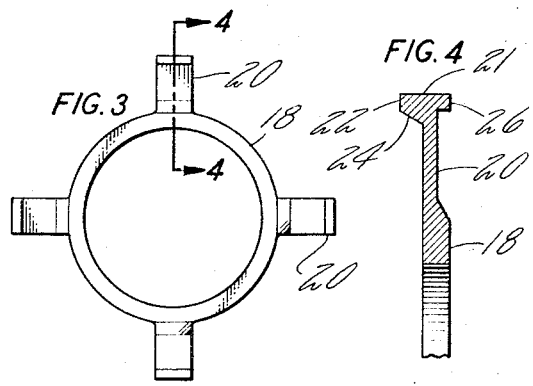
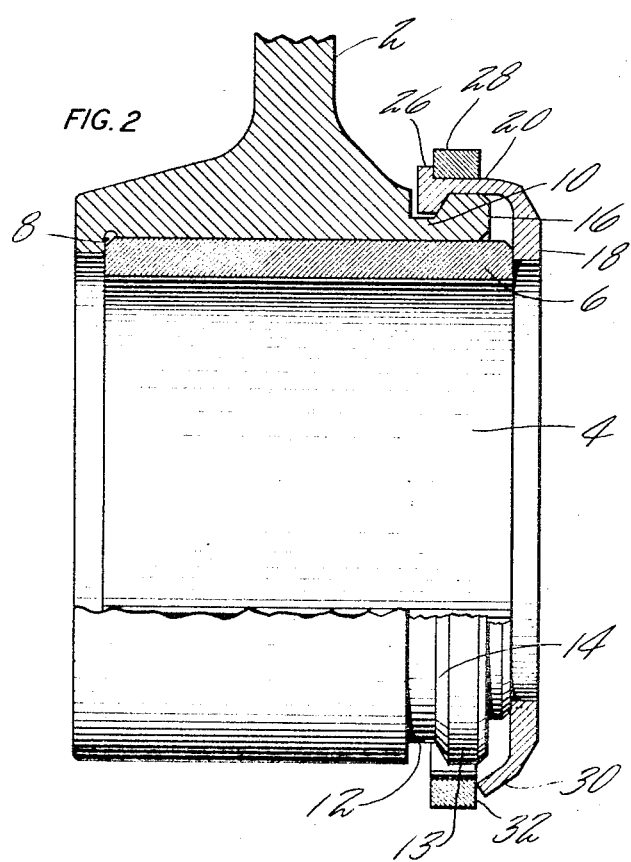
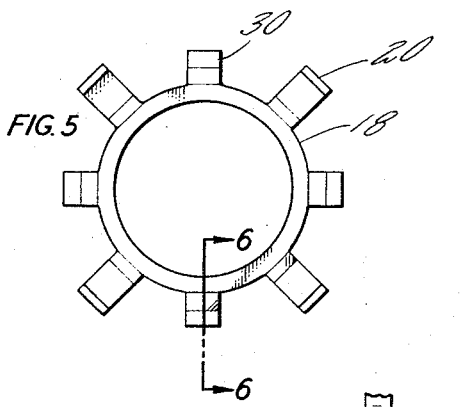
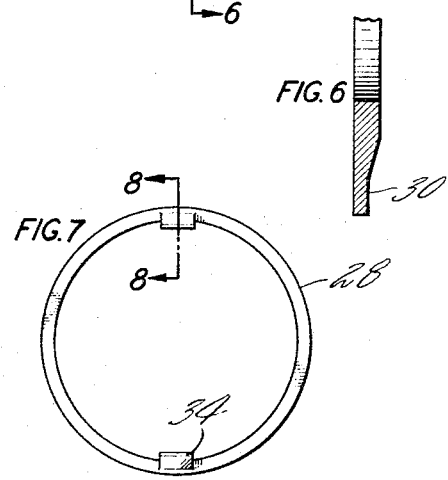
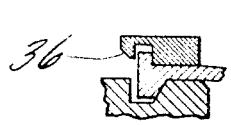
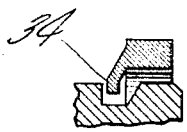
*INVENTOR.*
VICTOR A. DiRAMIO
BY *Richard M. James*
ATTORNEY

United States Patent Office 3,352,609
Patented Nov. 14, 1967

3,352,609
THREADLESS ELEMENT-RETAINING ASSEMBLY
Victor A. Di Ramio, Glastonbury, Conn., assignor to United Aircraft Corporation, East Hartford, Conn., a corporation of Delaware
Filed Dec. 7, 1965, Ser. No. 512,108
6 Claims. (Cl. 308—22)

The invention described herein was made in the course of, or under, a contract with the U.S. Atomic Energy Commission.

This invention relates in general to locking devices, especially those wherein it is desired to retain a member such as a journal, roller or ball bearing in a cooperating recess in a bearing housing.

More specifically, this invention relates to threadless locking devices, and contemplates the retention of a bearing in a housing through the use of a deformable retaining ring which abuts the bearing and engages a peripheral shoulder provided on the housing around a recess therein. In its most preferred form it further contemplates locking means for the retaining ring whereby the retaining ring is held securely in position in the presence of vibration or other unintentionally generated forces.

In the development of high performance space age apparatus it has become necessary to utilize the more exotic metals and alloys as containment materials for the high temperature corrosive fluids used in these systems. Many of these advanced materials, however, such as titanium or columbium, are extremely susceptible to galling when used in environments involving rubbing contact. For this reason mechanical connections between components fabricated of these materials must generally be made without the use of threaded connections, unless special surface preparation techniques are first employed.

Accordingly, it is a principal object of this invention to provide means for retaining one element within a cooperating recess in a second element without the use of threaded connections.

These and other objects and advantages of this invention will be set forth in the following description or will be evident from the practice of this invention, the operation of which can best be discussed by reference to the several preferred embodiments illustrated in the drawings, of which:

FIGURE 1 is an end view of the most preferred form of the element-retaining assembly.

FIGURE 2 is a view of the assembly taken along line 2—2 of FIGURE 1 and shown partially in cross section, illustrating particularly the engagement of the retaining ring with a peripheral shoulder provided on the bearing housing.

FIGURE 3 is a view of one form of the retaining ring, illustrating particularly a plurality of locking fingers peripherally disposed thereon.

FIGURE 4 is a cross-sectional view of the retaining ring taken along line 4—4 of FIGURE 3.

FIGURE 5 is a view of the retaining ring in its most preferred embodiment, illustrating particularly a plurality of locking ring retaining tabs positioned intermediate the locking fingers.

FIGURE 6 is a cross-sectional view of the retaining tab of FIGURE 5 taken along line 6—6 thereof.

FIGURE 7 is an end view of one embodiment of the locking ring.

FIGURE 8 is a fragmentary cross-sectional view on the line 8—8 of the locking ring of FIGURE 7, with the locking ring shown positioned on the assembly.

FIGURE 9 is a view similar to FIGURE 8 showing another embodiment of the locking ring.

Described broadly and as hereinbefore indicated, the present invention contemplates the retention of one member within a cooperating cavity or recess in a second member, utilizing a retaining ring which abuts the outer end of the retained member and engages the second member at a peripheral shoulder surrounding the recess.

As is best illustrated in the embodiment shown in FIGURES 1 and 2, a housing 2 is provided having a cavity or recess 4 therein adapted to closely receive and contain a bearing sleeve 6. The recess 4 is provided with an annular seat 8 at its innermost end against which the sleeve 6 bears, axially positioning the sleeve within the recess. In other applications, the sleeve may be replaced by a ball or roller bearing, or other suitable member, depending upon the application in which the present invention is used.

The housing 2 includes an annular flange portion 10 comprising an extension of the housing in the direction of the major opening of the recess. A groove 12 formed in the outer surface of the flange portion 10 of the housing provides a shoulder 13, the plane of the shoulder extending normal to the axis of the recess. As seen in cross-section, the outer wall 14 of the groove 12, and correspondingly the inner upstanding edge of the shoulder 13, is preferably tapered outwardly, the groove, therefore, having a greater dimension at its opening than at its base.

As shown in FIGURE 2, the sleeve 6 is preferably formed to a length somewhat greater than its seating depth in the housing recess. Accordingly, when it is positioned within the recess 4, it protrudes slightly beyond the outer extremity 16 of the housing.

A retaining ring 18, as shown in FIGURE 5, is placed to bear against the end of the sleeve 6 where it protrudes beyond the housing and a peripheral portion of the ring is deformed into engagement with the shoulder 13 provided on the housing. In its most simplified form, the retaining ring may be seen to be of generally annular shape with a plurality of locking fingers 20 cantilevered radially outward from its periphery. In a bearing application the diameter of the hole in the retaining ring is made slightly greater than the inner diameter of the sleeve to accommodate the passage of a rotating shaft therethrough, but somewhat less than the outer diameter of the sleeve. This is necessary since the retaining ring 18 must bear against the sleeve 6 when the device is assembled.

Each of the locking fingers 20 included in the retaining ring, as seen in cross-section in FIGURE 4, comprises a shank portion 20 of reduced wall thickness and a head portion 21 at the distal end thereof, and is of sufficient length to permit its engagement, after bending, with the shoulder on the housing. The head portion 21 of the locking finger is provided with a shoulder engagement lug 22 at its inner end which is adapted to fit within the groove 12 and which is tapered at its lower surface 24 to substantially and cooperatively conform to the taper provided at the inner edge of the shoulder. Accordingly, as the finger 20 is deformed and the lug 22 is forced into the groove 12, surfaces 14 and 24 are forced into engagement and the retaining ring 18 is drawn axially inward toward the recess. As the retaining ring is tightened against the sleeve 6, the sleeve is forced against the annular seat 8 positioned in the recess.

A somewhat similar projection is provided on the other side of the head portion of the locking finger 20, this projection forming a stop 26 which axially positions the locking ring 28 over the deformed fingers of the retaining ring and around the flange portion of the housing. As is evident, the locking ring is utilized to force the lugs 22 of the respective fingers into the groove and into engagement with the shoulder. It similarly prevents disengagement of the fingers with the housing as long as it remains in position.

In the more preferred embodiment of the retaining ring, FIGURE 5, a plurality of radially-directed retaining tabs 30 are provided about the periphery of the retaining ring intermediate each of the locking fingers 20. The retaining tabs are formed with a reduced wall thickness, as seen in FIGURE 6, to permit their deformation as the locking ring is passed thereover during assembly. After the locking ring has been placed in position, the retaining tabs 30 are brought to bear against its outer edge 32 to retain it against the stop 26. Accordingly, the retaining tabs will be seen to prevent accidental retrogression of the locking ring during operation of the apparatus.

As above discussed, the reaining tabs 30 on the retaining ring are utilized to maintain the locking ring in position on the assembly. As may be seen by reference to FIGURES 7, 8 and 9, other means for holding the locking ring in position are contemplated. Appropriate means for performing this function may be provided on the locking ring itself. In the locking ring embodiment of FIGURE 8, dogs 34 are provided on the locking ring, the dogs 34 engaging in the groove in the housing to prevent retrogression of the ring from the assembly. In this embodiment, the locking ring would necessarily be so fabricated and so indexed that in the assembly the dogs would be positioned intermediate the locking fingers of the retaining ring 18, which in this application would be of the type shown in FIGURE 3.

Somewhat similarly, dogs 36 may be provided on the locking ring in the manner illustrated in FIGURE 9. In this arrangement, each dog would engage a stop 26 on the respective locking fingers. In this embodiment, therefore, the locking ring would be so fabricated and so indexed that the dogs would correspond in circumferential location to the position of the locking fingers of the retaining ring.

It will be seen that by this invention means has been provided for retaining a bearing in a bearing housing without the use of threaded elements. Moreover, the connection provided is simply made, positive in its operation, and secure against unintentional loosening through the action of vibration or other unintentionally generated forces.

While particular embodiments of the invention have been shown and described, it will be understood that various modifications may be made thereto within the true scope of the invention as defined by the following claims.

I claim:
1. A threadless element-retaining assembly comprising:
a housing having a cavity therein one end of which terminates in an opening in the housing, the housing including an annular portion surrounding the opening, the annular portion having a shoulder formed on its outer surface extending in a plane normal to the axis of the opening,
a retained element positioned within the cavity,
a retaining ring abutting the exposed end of the retained element, the retaining ring having a plurality of deformable locking fingers disposed about its periphery, each of the fingers including a shoulder engagement lug at the distal end thereof, the fingers being so deformed that the respective lugs engage the housing at the shoulder,
and an annular locking ring encircling the deformed fingers to prevent disengagement of the shoulder engagement lugs.

2. The assembly of claim 1 in which:
the engaged surfaces of the shoulder and the shoulder engagement lugs are mutually and cooperatively inclined with respect to one another such that the retaining ring is drawn axially inward toward the housing as the lugs are forced into engagement with the shoulder.

3. The assembly of claim 2 in which:
means is provided for maintaining the locking ring in a fixed axial position on the assembly.

4. The assembly of claim 2 in which:
the retaining ring is provided with a plurality of deformable retaining tabs peripherally positioned thereon intermediate the locking fingers, the free end of the tabs bearing on the outer end of the locking ring to prevent its retrogression,
and each of the locking fingers is provided with a protruding stop at the distal end thereof, the stop abutting the inner end of the locking ring to axially position the locking ring on the assembly.

5. The assembly of claim 2 in which:
the locking ring is provided with a plurality of inwardly-directed dogs which engage the housing at the shoulder to prevent retrogression of the locking ring.

6. In apparatus wherein a rotating shaft is supported in a bearing carried in a recess in a housing, means for retaining the bearing in the recess comprising:
a shoulder on the outer surface of the housing surrounding the recess, the inner edge of the shoulder being inclined outwardly toward the recess opening,
an annular retaining ring loosely encircling the shaft and abutting the exposed end of the bearing, the retaining ring having a plurality of locking fingers peripherally disposed thereon each of which includes a shoulder engagement lug at the distal end thereof, the inner edge of each engagement lug being cooperatively inclined with respect to the shoulder, the locking fingers being bent axially inward toward the housing with the inclined surface of lugs engaging the inclined surface of the shoulder,
an annular locking ring closely encircling the bent locking fingers to prevent their disengagement with the housing,
and means for maintaining the locking ring in a fixed axial position with respect to the housing including a plurality of deformable retaining tabs integral with the retaining ring and peripherally disposed thereon intermediate the locking fingers, the free end of the retaining tabs bearing on the outer end of the locking ring.

References Cited

UNITED STATES PATENTS 2,985,493   5/1961   Dinsmore _____ 308—22

EDGAR W. GEOGHEGAN, *Primary Examiner.*

FRANK SUSKO, *Examiner.*